(12) United States Patent
Hendrickson

(10) Patent No.: US 10,627,697 B2
(45) Date of Patent: Apr. 21, 2020

(54) OPTICAL SWITCH

(71) Applicant: Government of the United States, as represented by the Secretary of the Air Force, Wright-Patterson AFB, OH (US)

(72) Inventor: Joshua R. Hendrickson, Dayton, OH (US)

(73) Assignee: United States of America as represented by the Secretary of the Air Force, Wright Patterson ( * ) Notice: Subject to any disclaimer, the term of this patent is extended or adjusted under 35 U.S.C. 154(b) by 0 days.

(21) Appl. No.: 16/451,343

(22) Filed: Jun. 25, 2019

(65) Prior Publication Data

US 2020/0096835 A1     Mar. 26, 2020

Related U.S. Application Data

(60) Provisional application No. 62/736,045, filed on Sep. 25, 2018.

(51) Int. Cl.
*G02F 1/225* (2006.01)
*G02F 1/313* (2006.01)
(Continued)

(52) U.S. Cl.
CPC ......... *G02F 1/2257* (2013.01); *G02B 6/1225* (2013.01); *G02F 1/3136* (2013.01); *G02F 2001/212* (2013.01); *G02F 2202/32* (2013.01)

(58) Field of Classification Search
CPC ...... G02F 1/011; G02F 1/0147; G02F 1/0316; G02F 1/225; G02F 1/2257; G02F 1/3136;
(Continued)

(56) References Cited

U.S. PATENT DOCUMENTS

| 6,052,495 A | 4/2000 | Little et al. |
| 6,668,006 B1 | 12/2003 | Margalit et al. |

(Continued)

FOREIGN PATENT DOCUMENTS

| EP | 1536274 A1 | 6/2005 |
| EP | 1581828 B1 | 8/2012 |

(Continued)

OTHER PUBLICATIONS

Hendrickson, J., et al., "Ultrasensitive silicon photonic-crystal nanobeam electro-optical modulator: Design and simulation," Optics Express, vol. 22, No. 3, Feb. 10, 2014, pp. 3271-3283.

(Continued)

*Primary Examiner* — Michael P Mooney
(74) *Attorney, Agent, or Firm* — AFMCLO/JAZ; Charles Figer

(57) ABSTRACT

An optical switch includes a first Mach-Zehnder waveguide interferometer; a second Mach-Zehnder waveguide interferometer substantially parallel to the first Mach-Zehnder waveguide interferometer; and a pair of directional couplers, wherein each directional coupler is connected at each end of the first Mach-Zehnder waveguide interferometer and the second Mach-Zehnder waveguide interferometer, wherein each of the first Mach-Zehnder waveguide interferometer and the second Mach-Zehnder waveguide interferometer include a pair of coupled resonator optical waveguides sequentially aligned to one another and each including a semiconductor substrate; a silicon layer above the semiconductor substrate; an elongated photonic crystal structure on the silicon layer to propagate an electromagnetic signal therethrough; a plurality of holes in the elongated photonic crystal structure; and a pair of electrical contacts in the silicon layer and positioned adjacent to the elongated photonic crystal structure.

20 Claims, 15 Drawing Sheets

(51) Int. Cl.
*G02B 6/122* (2006.01)
*G02F 1/21* (2006.01)

(58) Field of Classification Search
CPC .. G02F 1/3133; G02F 1/365; G02F 2001/212; G02F 2202/32; G02B 6/12; G02B 6/1225; G02B 6/29352; G02B 6/12011; G02B 6/12021
USPC .......................... 385/1–3, 14, 16, 39, 49–50
See application file for complete search history.

(56) References Cited

U.S. PATENT DOCUMENTS

| | | | |
|---|---|---|---|
| 6,917,431 | B2 | 7/2005 | Soljacic et al. |
| 6,937,781 | B2 | 8/2005 | Shirane et al. |
| 7,269,305 | B2 | 9/2007 | Tsuda et al. |
| 7,421,179 | B1 | 9/2008 | Jiang et al. |
| 7,440,658 | B2 | 10/2008 | Furuya et al. |
| 7,529,442 | B2 | 5/2009 | Glebov et al. |
| 7,760,970 | B2 | 7/2010 | Baehr-Jones et al. |
| 8,023,822 | B2 | 9/2011 | Costa et al. |
| 8,374,469 | B2 | 2/2013 | Yamada |
| 8,478,088 | B2 | 7/2013 | Tokushima |
| 8,655,114 | B2 | 2/2014 | Popovic |
| 2014/0193155 | A1 | 7/2014 | Popovic et al. |
| 2017/0336564 | A1* | 11/2017 | Soref ............... G02F 1/3136 |

FOREIGN PATENT DOCUMENTS

| | | |
|---|---|---|
| IN | 1044/KOL/2008 B | 12/2009 |
| WO | 2013013695 A1 | 1/2013 |

OTHER PUBLICATIONS

Soref, R., et al., "Proposed ultralow-energy dual photonic-crystal nanobeam devices for on-chip N ×N switching, logic, and wavelength multiplexing," Optics Express, vol. 23, No. 25, Dec. 9, 2015, pp. 32582-32596.

Zhou, H., et al., "Compact, submilliwatt, 2 ×2 silicon thermo-optic switch based on photonic crystal nanobeam cavities," Photonics Research, vol. 5, No. 2, Apr. 1, 2017, pp. 108-112.

Soref, R., "Mid-infrared 2 ×2 electro-optical switching by silicon and germanium three-waveguide and four-waveguide directional couplers using free-carrier injection," Photonics Research, vol. 2, No. 5, Oct. 2014, pp. 102-110.

Govdeli, A., et al., "Integrated Optical Modulator Based on Transition between Photonic Bands," Scientific Reports, vol. 8, No. 1619, Jan. 26, 2018, pp. 1-11.

Soref, R., et al., "Simulation of germanium nanobeam electro-optical 2 ×2 switches and 1 ×1 modulators for the 2 to 5 μm infrared region," Optics Express, vol. 24, No. 9, Apr. 20, 2016, pp. 9369-9382.

Deotare, P., et al., "All optical reconfiguration of optomechanical filters," Nature Communications, 3:846, May 22, 2012, pp. 1-8.

Gu, L., et al., "Thermooptically Tuned Photonic Crystal Waveguide Silicon-on-Insulator Mach-Zehnder Interferometers," IEEE Photonics Technology Letters 19(5), Apr. 2007, pp. 342-344.

Zhang, X., et al., "Coupled Photonic Crystal Microcavities for Optical Switching over Wide Spectral Range," 2015 IEEE Optical Interconnects Conference, OI, San Diego, California, Mar. 2015, pp. 136-137.

Yariv, A., et al., "Coupled-resonator optical waveguide: a proposal and analysis," Optics Letters, vol. 24, No. 11, Jun. 1, 1999, pp. 711-713.

Liu, H., et al., "Designing coupled-resonator optical waveguides based on high-Q tapered grating-defect resonators," Optics Express., vol. 20, No. 8, Apr. 9, 2012, pp. 9249-9263.

Xia, F., et al., "Coupled resonator optical waveguides based on silicon-on-insulator photonic wires," Appl. Phys. Lett. 89, (2006), pp. 041122-1 through 041122-3.

Liu, K., et al., "Enhanced interaction strength for a square plasmon resonator embedded in a photonic crystal nanobeam cavity," Journal of Nanophotonics, vol. 9(1), (2015), 093790, pp. 1-9.

Gibson, R., et al., "GeSn nanobeam light-emitting diode as a GHz-modulated light source," IEEE Photonics Journal, vol. 9, No. 5, Oct. 2017, 12 pages.

Qimin, Q., et al., "Photonic crystal nanobeam cavity strongly coupled to the feeding waveguide," Appl. Phys. Lett. 96 (20), (2010), 203102, pp. 1-4.

* cited by examiner

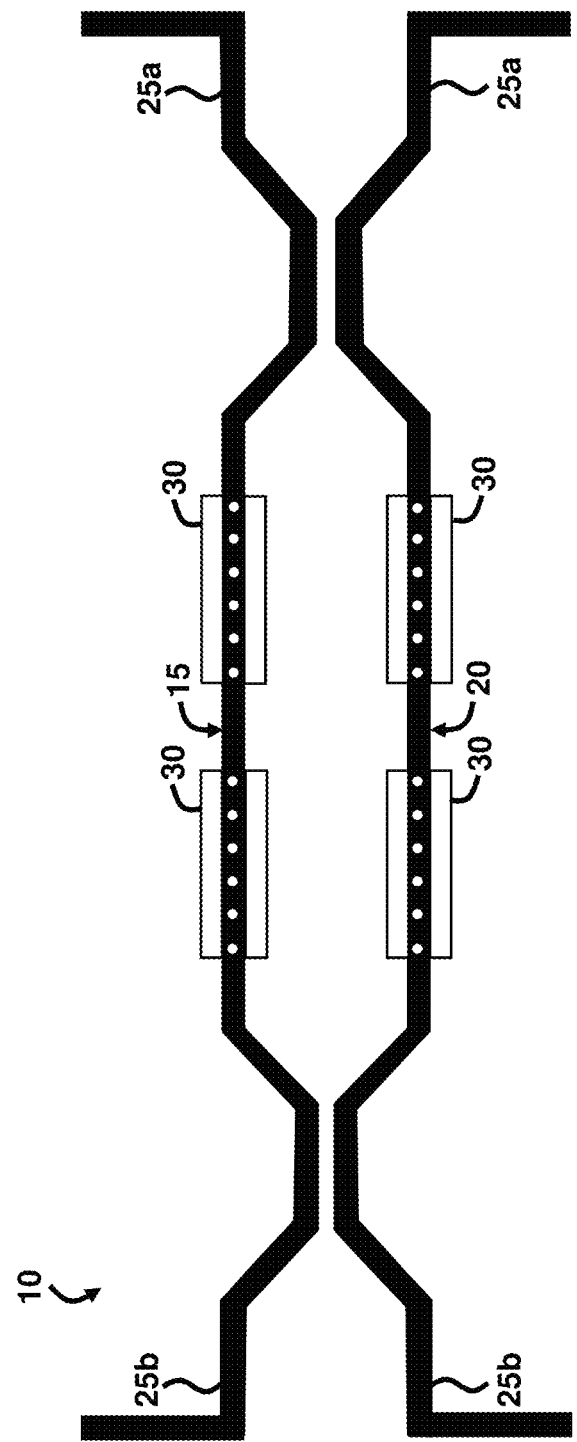

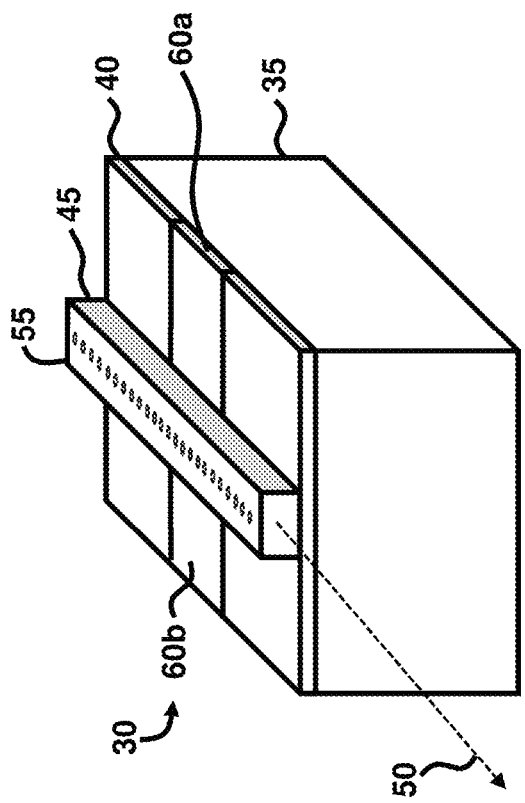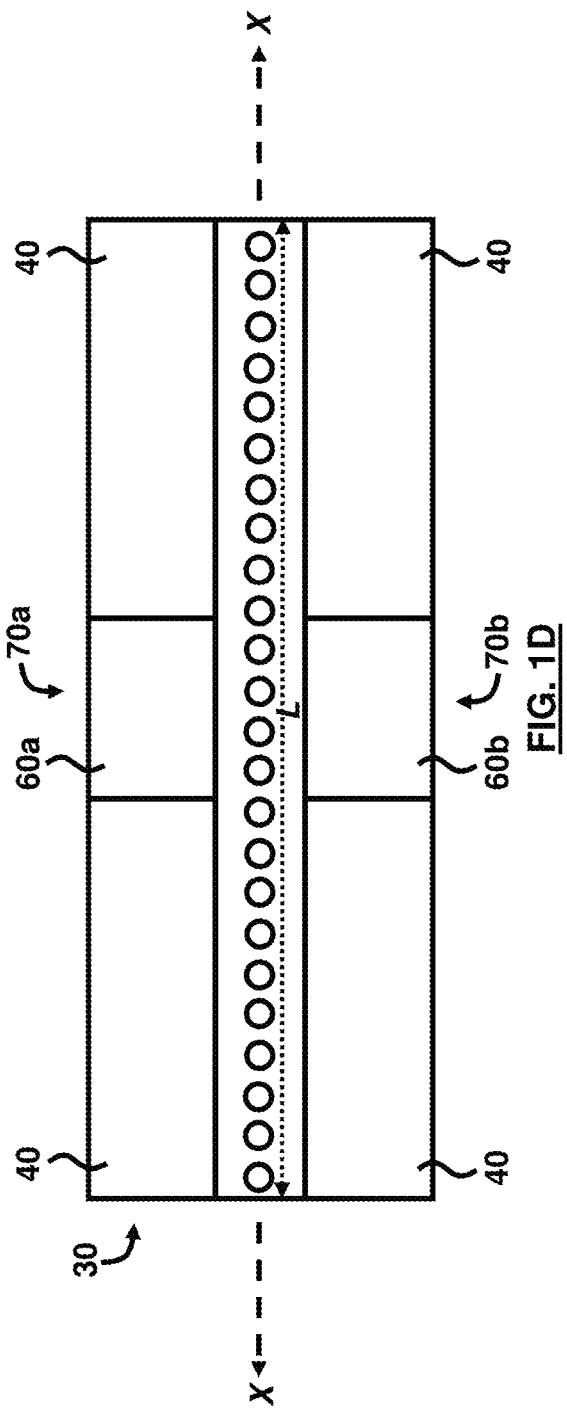

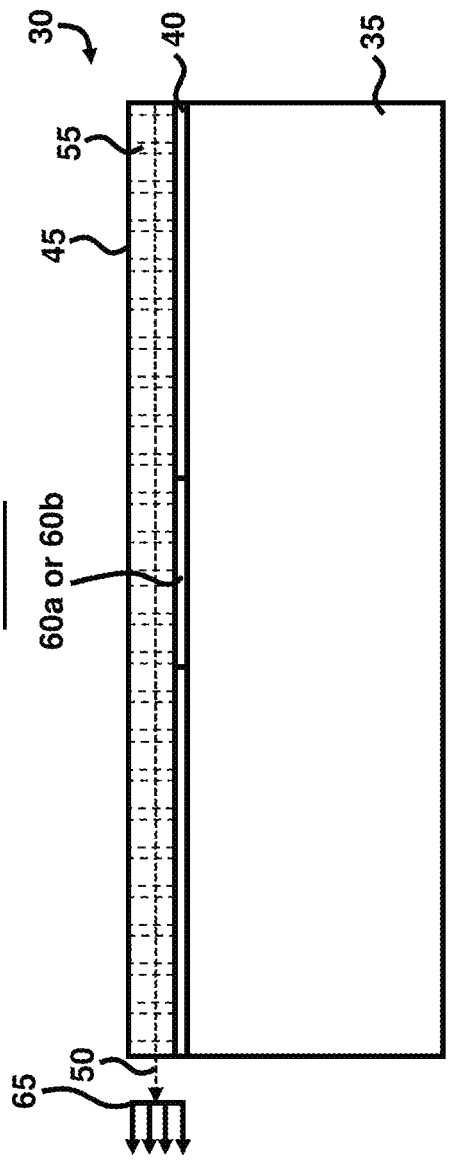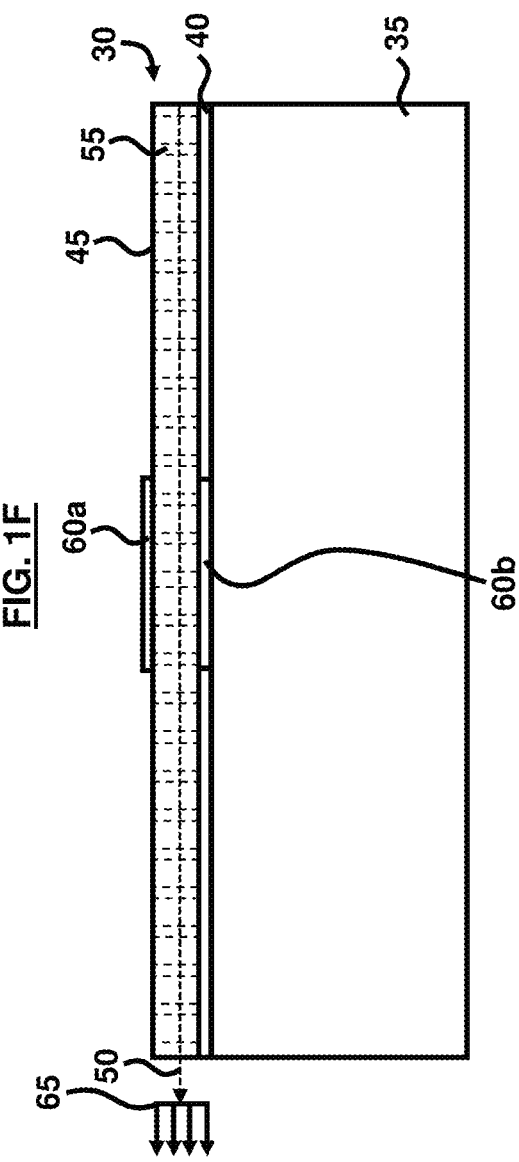

OPTICAL SWITCH

CROSS-REFERENCE TO RELATED APPLICATION(S)

This application claims the benefit of U.S. Provisional Patent Application No. 62/736,045 filed on Sep. 25, 2018, which is incorporated herein by reference in its entirety.

GOVERNMENT INTEREST

The invention described herein may be manufactured and used by or for the Government of the United States for all government purposes without the payment of any royalty.

BACKGROUND

Field of the Invention

The embodiments herein generally relate to photonic devices used for telecommunications, and more particularly to waveguides used for transmission of optical and/or electromagnetic signals.

Background of the Invention

The narrowband transmission resonance of a one-dimensional (1D) photonic crystal cavity (PhC) nanobeam has a spectral profile as a function of wavelength, which can be described mathematically by a Lorentzian function. A problem or issue with the Lorentzian lineshape is that the profile does not have steep sidewalls but rather a somewhat gradual tailing off on either side of the resonance peak. Consequently, when that profile is shifted rigidly along the wavelength axis (without change of shape) by a perturbation of the mode index, then there is typically "tail overlap" at the wavelength of operation (the unperturbed resonance-peak wavelength) and that overlap constitutes significant optical cross talk (CT) which is obviously not wanted in switching applications. Furthermore, existing waveguide technologies tend to have relatively large footprints, relatively high energy/bit switching values, and relatively large crosstalk noise. Conventional waveguide devices use lithium niobate waveguides or coupled ring resonators which have increased noise and a large footprint or single resonators which have increased noise.

BRIEF SUMMARY OF THE INVENTION

In view of the foregoing, an embodiment herein provides an optical switch comprising a first Mach-Zehnder waveguide interferometer; a second Mach-Zehnder waveguide interferometer substantially parallel to the first Mach-Zehnder waveguide interferometer; and a pair of directional couplers, wherein each directional coupler is connected at each end of the first Mach-Zehnder waveguide interferometer and the second Mach-Zehnder waveguide interferometer, wherein each of the first Mach-Zehnder waveguide interferometer and the second Mach-Zehnder waveguide interferometer comprise a pair of coupled resonator optical waveguides sequentially aligned to one another and each comprising a semiconductor substrate; a silicon layer above the semiconductor substrate; an elongated photonic crystal structure on the silicon layer to propagate an electromagnetic signal therethrough; a plurality of holes in the elongated photonic crystal structure; and a pair of electrical contacts in the silicon layer and positioned adjacent to the elongated photonic crystal structure.

The pair of coupled resonator optical waveguides may be spaced apart from one another. The plurality of holes may be substantially perpendicular to a direction of a longitudinal axis of the elongated photonic crystal structure. The pair of coupled resonator optical waveguides may be configured to spectrally shape a transmission and reflection of a light field created by the electromagnetic signal by shaping the light field to be substantially rectangular. The spectral shaping of the transmission and reflection of the light field may be configured to reduce a noise of the electromagnetic signal. The spectral shaping of the transmission and reflection of the light field may be configured to reduce an energy consumption required for optical switching of the electromagnetic signal. The pair of electrical contacts may vertically sandwich the elongated photonic crystal structure. The pair of electrical contacts may laterally sandwich the elongated photonic crystal structure. The silicon layer may be disposed on each longitudinal side of the elongated photonic crystal structure. The silicon layer on each longitudinal side may extend a length of the elongated photonic crystal structure.

Another embodiment provides an in-line coupled dual nanobeam Mach Zehnder interferometer comprising a semiconductor substrate; a silicon layer above the semiconductor substrate; a pair of photonic crystal structures spaced apart from each other and sequentially aligned on the silicon layer to transmit an optical signal therethrough; a plurality of 1D tapered-diameter lattice air holes aligned along a longitudinal axis of the pair of photonic crystal structures; doped regions in the silicon layer and positioned adjacent to the pair of photonic crystal structures; an input coupler connected to a first end of a first photonic crystal structure of the pair of photonic crystal structures to input the optical signal into the pair of photonic crystal structures; and an output coupler connected to a second end of a second photonic crystal structure of the pair of photonic crystal structures to output the optical signal from the photonic crystal structure, wherein the pair of photonic crystal structures are configured to spectrally shape a transmission and reflection of a light field created by the optical signal by shaping the light field to be substantially rectangular.

The doped regions may comprise P-N doped regions. The doped regions may comprise P-I-N doped regions. The doped regions may comprise P-I-P doped regions. The doped regions may comprise N-I-N doped regions. The pair of photonic crystal structures may be spaced apart from each other by a separation distance that is equal to a photonic crystal lattice spacing. The photonic crystal lattice spacing may be 350 nm.

Another embodiment provides an optical switch comprising a pair of photonic crystal structures aligned to transmit an electromagnetic signal; a plurality of holes positioned through the pair of photonic crystal structures and oriented substantially transverse to a longitudinal axis of the pair of photonic crystal structures; a plurality of electrical contacts connected to the pair of photonic crystal structures; and a pair of couplers connected to the pair of photonic crystal structures, wherein the pair of photonic crystal structures are configured to spectrally shape a transmission and reflection of a light field created by the electromagnetic signal by shaping the light field to be substantially rectangular, wherein the spectral shaping of the transmission and reflection of the light field is configured to reduce a noise of the electromagnetic signal, and wherein the spectral shaping of the transmission and reflection of the light field is configured to reduce an energy consumption required for optical switching of the electromagnetic signal. The plurality of holes may comprise 1D tapered-diameter lattice holes. The plurality of electrical contacts may be configured for any of thermo optic and electro optic switching.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1B is a schematic top view illustrating the optical switch of FIG. 1A with coupled resonator optical waveguides, according to an embodiment herein;

FIG. 1C is a schematic perspective view illustrating the optical waveguide of the optical switch of FIG. 1B, according to an embodiment herein;

FIG. 1D is a schematic top view illustrating the optical waveguide of FIG. 1C, according to an embodiment herein;

FIG. 1E is a schematic cross-sectional view illustrating the optical waveguide of FIG. 1C with laterally positioned electrical contacts, according to an embodiment herein;

FIG. 1F is a schematic cross-sectional view illustrating the optical waveguide of FIG. 1C with vertically positioned electrical contacts, according to an embodiment herein;

DETAILED DESCRIPTION OF THE INVENTION

Figure 1A:
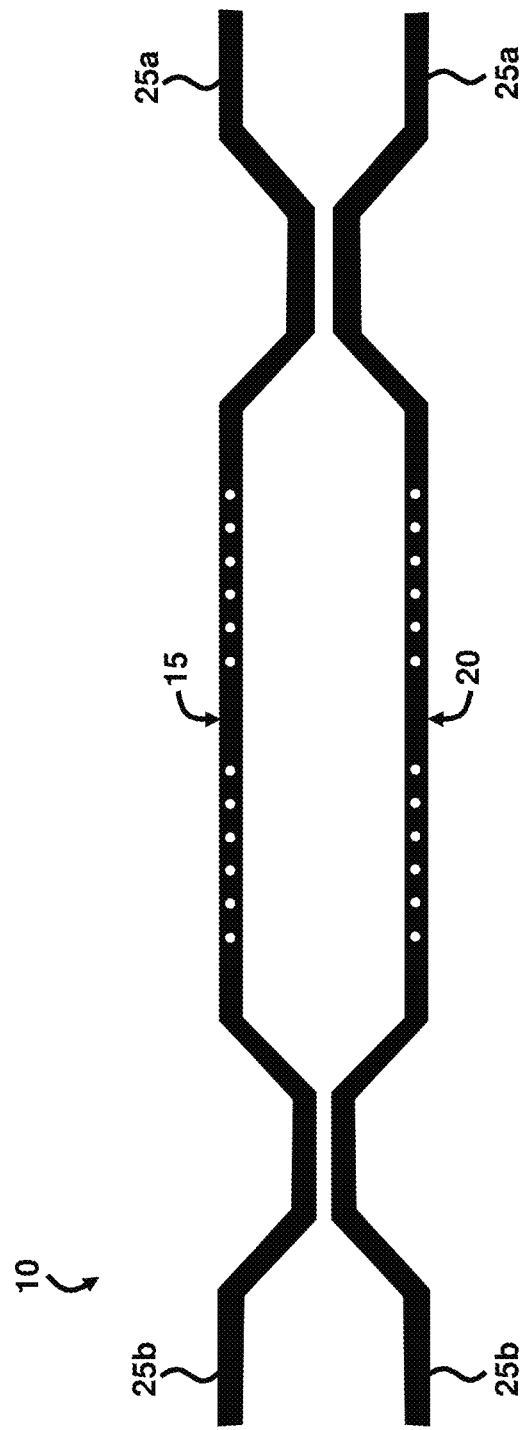
FIG. 1A is a schematic top view illustrating an optical switch, according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

The embodiments herein provide an improvement to existing waveguide based optical switches. The embodiments herein reduce the crosstalk in on-chip 2×2 Mach-Zehnder-based optical switches to solve the problem of unwanted noise in telecommunication-based systems. Traditional devices use lithium niobate waveguides or coupled ring resonators which have more noise and a larger footprint or single resonators which have more noise. The embodiments herein spectrally shape the transmission and reflection of a light field, making it more rectangular in shape which allows for reduced noise as well as reduced energy consumption for optical switching. The device comprises a 2×2 Mach-Zehnder waveguide interferometer with 3 dB couplers on either end. The device comprises 220 nm high by 600 nm wide silicon waveguides sitting on an $SiO_2$/Si substrate. A photonic crystal structure with cylindrical hole pairs is etched into the Si waveguide which are quadratically tapered down in each direction from the central zero-length cavity region. The lattice spacing may be 350 nm and the hole radii range from approximately 88 nm to 125 nm. The waveguide core sits upon an ultrathin 50 nm silicon platform. Local N- and/or P-doped regions of approximately 2 micron in length are formed in the platform, centered at the PhC cavity region. The doped regions can serve as electrical contacts for performing either thermo optic (TO) or electro optic (EO) switching. In the EO case a P-N or P-I-N structure could be used while in the TO case a P-I-P and N-I-N structure may be used. In each arm of the interferometer two such photonic crystal structures are placed one after another and their separation distance is exactly equal to the photonic crystal lattice spacing, thus forming a couple resonator configuration. Referring now to the drawings, and more particularly to FIGS. 1A through 7, where similar reference characters denote corresponding features consistently throughout, there are shown exemplary embodiments. In the drawings, the size and relative sizes of components, layers, and regions, etc. may be exaggerated for clarity.

As described above, the "tail overlap" constitutes significant optical crosstalk which is not wanted in switching applications. The embodiments herein overcome this problem by providing a device in which the transmission band has steeper side walls, and as further described below, has more rectangular-shaped profiles are feasible by utilizing the coupled resonator optical waveguide (CROW) approach within each waveguide arm of the Mach Zehnder interferometer (MZI)—constituting an in-line coupled nanobeam rather than a simple singular nanobeam.

In accordance with the embodiments herein, the dual nanobeam MZI is a 2×2 crossbar switch that is actuated by TO or EO means. The switch features ultralow switching energy and speed (EO version) and complete compatibility with Si-based group IV integrated photonics. The merit of the 2×2 switch provided by the embodiments herein is judged by insertion loss (IL) and crosstalk (CT) metrics in both the cross and bar states. Generally, the embodiments herein provide a switch with a resonator (one in each arm of the MZI) that uses a 1D lattice of air holes along the axis of the channel waveguide, whereby the holes have diameters that are tapered to create a zero-point-defect resonator.

According to the embodiments herein, TO switching of CROW nanobeams (CNBs) is considered. TO switching is a low-power routing technique in its own right, but TO can be viewed as a precursor of EO switching. In other words, the TO response is a "precursor" or existence theorem for the EO behavior. A change in the effective index of a localized NB resonator of $\Delta n=0.002$ is readily attained with a TO heater strip deposited upon the exposed top surface of the nanobeam waveguide. The required temperature rise for such an index change is modest, around 11K in silicon, whose thermo-optic coefficient is $\Delta n/\Delta T=1.86\times 10^{-4}/K$. This TO induced change is generally larger than the $\Delta n=0.0005$ or 0.001 achieved in silicon by free carrier depletion or injection of a P-N or P-I-N structure. Thus, the TO response is an indicator of EO behavior that could be attained. Also, the loading down or dampening of the fundamental Bloch mode in the nanobeam resonator produced by the TO electrode is generally smaller than the attenuation found when P and N doped regions, along with their metal contact layers, are constructed in-and-around the nanobeam resonator. This means that the Q attained in the TO case is usually larger by a factor of two or three than the Q that is found in the EO case. Another aspect of the 2×2 switch is its polarization. In general, this is a polarized device and only one polarization is switched. TE polarization is assumed in accordance with the descriptions herein.

FIGS. 1A through 1F illustrates an optical switch 10 comprising a first Mach-Zehnder waveguide interferometer 15, a second Mach-Zehnder waveguide interferometer 20 substantially parallel to the first Mach-Zehnder waveguide interferometer 15, and a pair of directional couplers 25a, 25b. Each directional coupler 25a, 25b is connected at each end of the first Mach-Zehnder waveguide interferometer 15 and the second Mach-Zehnder waveguide interferometer 20. Each of the first Mach-Zehnder waveguide interferometer 15 and the second Mach-Zehnder waveguide interferometer 20 comprise a pair of coupled resonator optical waveguides 30 sequentially aligned to one another. In an example, the pair of coupled resonator optical waveguides 30 may be spaced apart from one another.

Each of the waveguides 30 comprise a semiconductor substrate 35, a silicon layer 40 (or any type of semiconductor such as germanium or a dielectric material, etc.) above the semiconductor substrate 35, and an elongated photonic crystal structure 45 on the silicon layer 40 to propagate an electromagnetic signal 50 therethrough. In an example, the optical switch 10 may comprise a pair of photonic crystal structures 45 aligned to transmit the electromagnetic signal 50. The pair of couplers 25a, 25b are connected to the pair of photonic crystal structures 45.

The waveguides 30 further comprise a plurality of holes 55 in the elongated photonic crystal structure 45. In an example, the plurality of holes 55 are positioned through the pair of photonic crystal structures 45 and are oriented substantially transverse to a longitudinal axis X of the pair of photonic crystal structures 45. The plurality of holes 55 may comprise 1D tapered-diameter lattice holes, according to an example. The plurality of holes 55 may be substantially perpendicular to the direction of the longitudinal axis X of the elongated photonic crystal structure 45.

The waveguides 30 further comprise a pair of electrical contacts 60a, 60b in the silicon layer 40 and positioned adjacent to the elongated photonic crystal structure 45. In an example, the plurality of electrical contacts 60a, 60b are connected to the pair of photonic crystal structures 45. The plurality of electrical contacts 60a, 60b may be configured for any of thermo optic and electro optic switching. The silicon layer 40 may be disposed on each longitudinal side 70a, 70b of the elongated photonic crystal structure 45. Moreover, the silicon layer 40 on each longitudinal side 70a, 70b may extend a length L of the elongated photonic crystal structure 45.

When an electromagnetic signal 50 is applied into the waveguides 30 and a voltage is applied to the plurality of electrical contacts 60a, 60b, the allowed transmission profile is spectrally shifted in wavelength. For an appropriately chosen signal wavelength, the application of the voltage to the plurality of electrical contacts 60a, 60b can switch the electromagnetic signal 50 from being in a state of high transmission into a state of high reflection, or vice versa. The plurality of holes 55 in the waveguides 30 allow for the transmission spectral window to become narrowband. The more holes 55 there are the narrow the spectral window can be. By cascading two or more coupled resonator optical waveguides 30 the transmission spectral window can then become more rectangular as opposed to Lorentzian. Without the holes 55 the transmission spectral window will be broadband and, while a spectral shift can still occur with application of voltage, the shift is much smaller than the broadband spectral window and is, therefore, essentially useless in terms of optical switching.

According to the embodiments herein, the same semi-vertical sides on the passband can be obtained by employing inline coupling of two zero-defect cavities, which are one-dimensional photonic crystal structure (1D PhC) tapered-diameter lattices of air holes 55. Experimentally, the Q values used are less than 10,000 but are adequate for sidewall steepening. In general, a CROW has N coupled resonators (e.g., resonator optical waveguides 30). Experimentally, the simplest nanobeam CROW, which is the N=2 case, is considered offering the most compact footprint and excellent performance. The footprint of the optical switch 10 is approximately 17 μm in length which is about a 30% reduction in the footprint of the N=2 case of racetrack resonators. Additionally, the N=2 nanobeam configuration offers a narrower and flatter transmission window with a sidewall transmission profile more closely matching the N=4 case for racetrack resonators.

Two assumptions are made here: (1) the TO heater (not shown) gives negligible loading of the nanobeam structures and the Q that is found via simulation is the inherent Q determined by the air hole lattice and by the width and height of the waveguide channel and its $SiO_2$ substrate, and (2) induced index shifts of 0.001 to 0.003 in the resonance region are easily obtained.

As shown in FIGS. 1E and 1F, the pair of coupled resonator optical waveguides 30 may be configured to spectrally shape a transmission and reflection of a light field 65 created by the electromagnetic signal 50 by shaping the light field 65 to be substantially rectangular. The spectral shaping of the transmission and reflection of the light field 65 may be configured to reduce a noise of the electromagnetic signal 50. Moreover, the spectral shaping of the transmission and reflection of the light field 65 may be configured to reduce an energy consumption required for optical switching of the electromagnetic signal 50. In an example, the pair of photonic crystal structures 45 are configured to spectrally shape a transmission and reflection of a light field 65 created by the electromagnetic signal 50 by shaping the light field 65 to be substantially rectangular, wherein the spectral shaping of the transmission and reflection of the light field 65 is configured to reduce a noise of the electromagnetic signal 50, and wherein the spectral shaping of the transmission and reflection of the light field 65 is configured to reduce an energy consumption required for optical switching of the electromagnetic signal 50.

As shown in FIGS. 1C through 1E, the pair of electrical contacts 60a, 60b may laterally sandwich the elongated photonic crystal structure 45. As shown in FIG. 1F, the pair of electrical contacts 60a, 60b may vertically sandwich the elongated photonic crystal structure 45. In the configuration of FIG. 1F, the pair of electrical contacts 60a, 60b may comprise holes that substantially align with the plurality of holes 55 in the waveguides 30. Accordingly, the embodiments herein can entail heating from either a lateral or vertical arrangement.

In an example, configuration, the optical switch 10 may comprise a 220 nm high by 600 nm wide silicon waveguide interferometer 15, 20 sitting on the $SiO_2/Si$ substrate 35, although other dimensions are possible in accordance with the embodiments herein. In an example, the plurality of holes 55 may comprise twelve cylindrical hole pairs etched into the Si elongated photonic crystal structure 45, which are quadratically tapered down in each direction from the central zero-length cavity region. However, other numbers and configurations of the plurality of holes 55 may be possible in accordance with the embodiments herein. In an example, the lattice spacing is 350 nm and the hole radii range from approximately 88 nm to 125 nm, although other sizes are possible in accordance with the embodiments herein. The elongated photonic crystal structure 45 sits upon an ultrathin 50 nm silicon platform (e.g., silicon layer 40), although other sizes are possible in accordance with the embodiments herein. Thus, on both longitudinal side 70a, 70b of the elongated photonic crystal structure 45 are silicon "wings" which extend the length L of the elongated photonic crystal structure 45 and are approximately 50 nm high, although other sizes are possible in accordance with the embodiments herein.

Figure 2A:
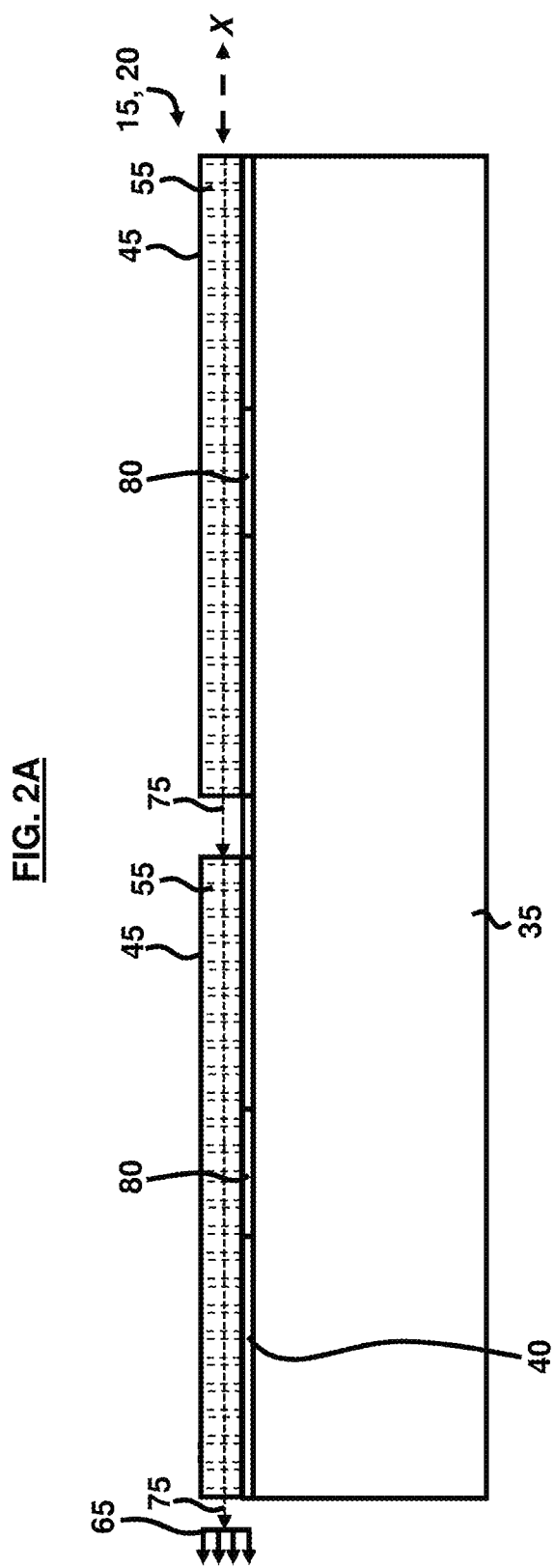
FIG. 2A is a schematic cross-sectional view illustrating an in-line coupled dual nanobeam Mach Zehnder interferometer, according to an embodiment herein.
Figure 2B:
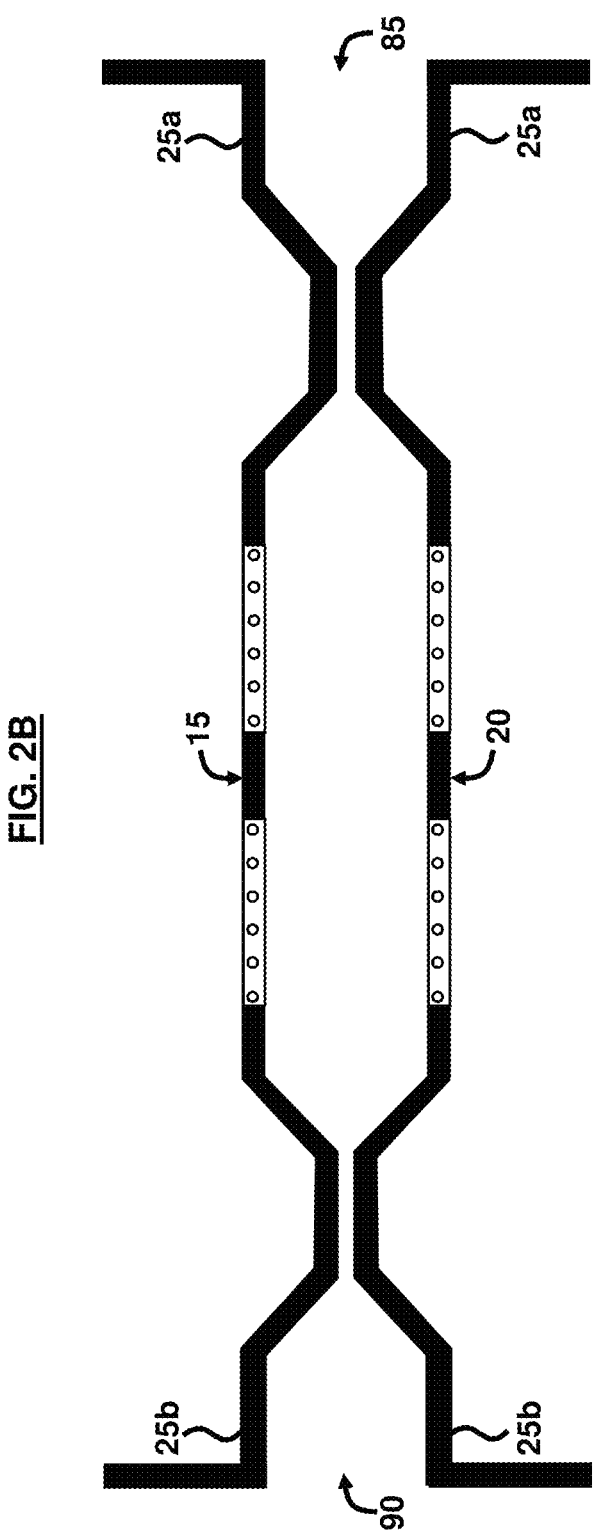
FIG. 2B is a schematic top view illustrating an in-line coupled dual nanobeam Mach Zehnder interferometer, according to an embodiment herein.

FIGS. 2A and 2B, with reference to FIGS. 1A through 1F, illustrates an in-line coupled dual nanobeam Mach Zehnder interferometer 15, 20 comprising a semiconductor substrate 35, a silicon layer 40 above the semiconductor substrate 35, a pair of photonic crystal structures 45 spaced apart from each other and sequentially aligned on the silicon layer 40 to transmit an optical signal 75 therethrough, a plurality of 1D tapered-diameter lattice air holes 55 aligned along a longitudinal axis X of the pair of photonic crystal structures 45; doped regions 80 in the silicon layer 40 and positioned adjacent to the pair of photonic crystal structures 45; an input coupler 25a connected to a first end 85 of a first photonic crystal structure 45 of the pair of photonic crystal structures 45 to input the optical signal 75 into the pair of photonic crystal structures 45; and an output coupler 25b connected to a second end 90 of a second photonic crystal structure 45 of the pair of photonic crystal structures 45 to output the optical signal 75 from the photonic crystal structure 45. The pair of photonic crystal structures 45 are configured to spectrally shape a transmission and reflection of a light field 65 created by the optical signal 75 by shaping the light field 65 to be substantially rectangular. The pair of photonic crystal structures 45 may be spaced apart from each other by a separation distance that is equal to a photonic crystal lattice spacing. In an example, the photonic crystal lattice spacing may be 355 nm.

Local N- and/or P-doped regions 80 of approximately 2 μm in length are formed in the wings (e.g., silicon layer 40), centered at the photonic crystal structure 45 cavity region, although other sizes are possible in accordance with the embodiments herein. The doped regions 80 can serve as electrical contacts for performing either EO or TO switching. In the EO case a P-N or P-I-N structure could be used while in the TO case a P-I-P and N-I-N structure may be used. In order to form a N=2 CROW, the pair of photonic crystal structures 45 are placed one after another and their separation distance is exactly equal to the photonic crystal structure lattice spacing.

Figure 3A:
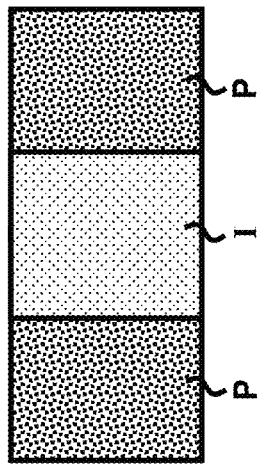
FIG. 3A is a schematic cross-sectional view illustrating P-N doping regions, according to an embodiment herein.
Figure 3B:
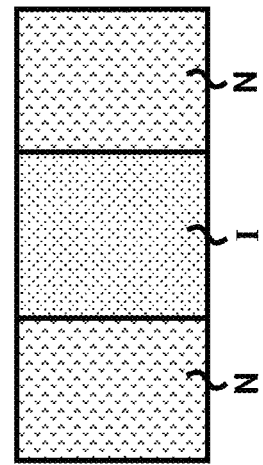
FIG. 3B is a schematic cross-sectional view illustrating P-I-N doping regions, according to an embodiment herein.
Figure 3C:
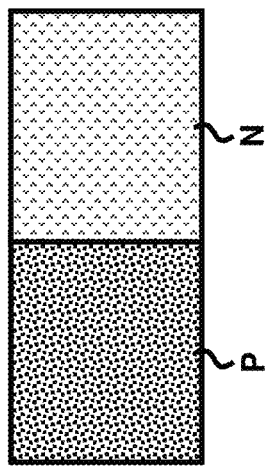
FIG. 3C is a schematic cross-sectional view illustrating P-I-P doping regions, according to an embodiment herein.
Figure 3D:
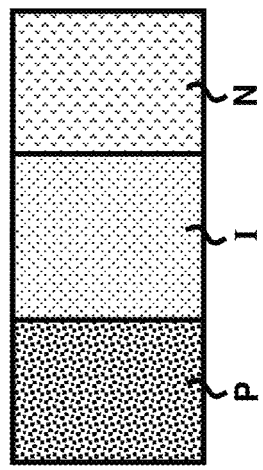
FIG. 3D is a schematic cross-sectional view illustrating N-I-N doping regions, according to an embodiment herein.

FIGS. 3A through 3D, with reference to FIGS. 1A through 2B, illustrate various configurations of the doped regions 80. FIG. 3A illustrates that the doped regions 80 may comprise P-N doped regions. FIG. 3B illustrates that the doped regions 80 may comprise P-I-N doped regions. FIG. 3C illustrates that the doped regions 80 may comprise P-I-P doped regions. FIG. 3D illustrates that the doped regions 80 may comprise N-I-N doped regions.

When an optical signal 75 is applied into the waveguides 30 and a voltage is applied to the doped regions 80, the allowed transmission profile is spectrally shifted in wavelength. For an appropriately chosen signal wavelength, the application of the voltage to the doped regions 80 can switch the optical signal 75 from being in a state of high transmission into a state of high reflection, or vice versa. The holes 55 in the pair of photonic crystal structures 45 allow for the transmission spectral window to become narrowband. The more holes 55 there are the narrow the spectral window can be. By cascading two or more photonic crystal structures 45 the transmission spectral window can then become more rectangular as opposed to Lorentzian. Without the holes 55 the transmission spectral window will be broadband and, while a spectral shift can still occur with application of voltage, the shift is much smaller than the broadband spectral window and is, therefore, essentially useless in terms of optical switching.

Experiment

Figure 4:
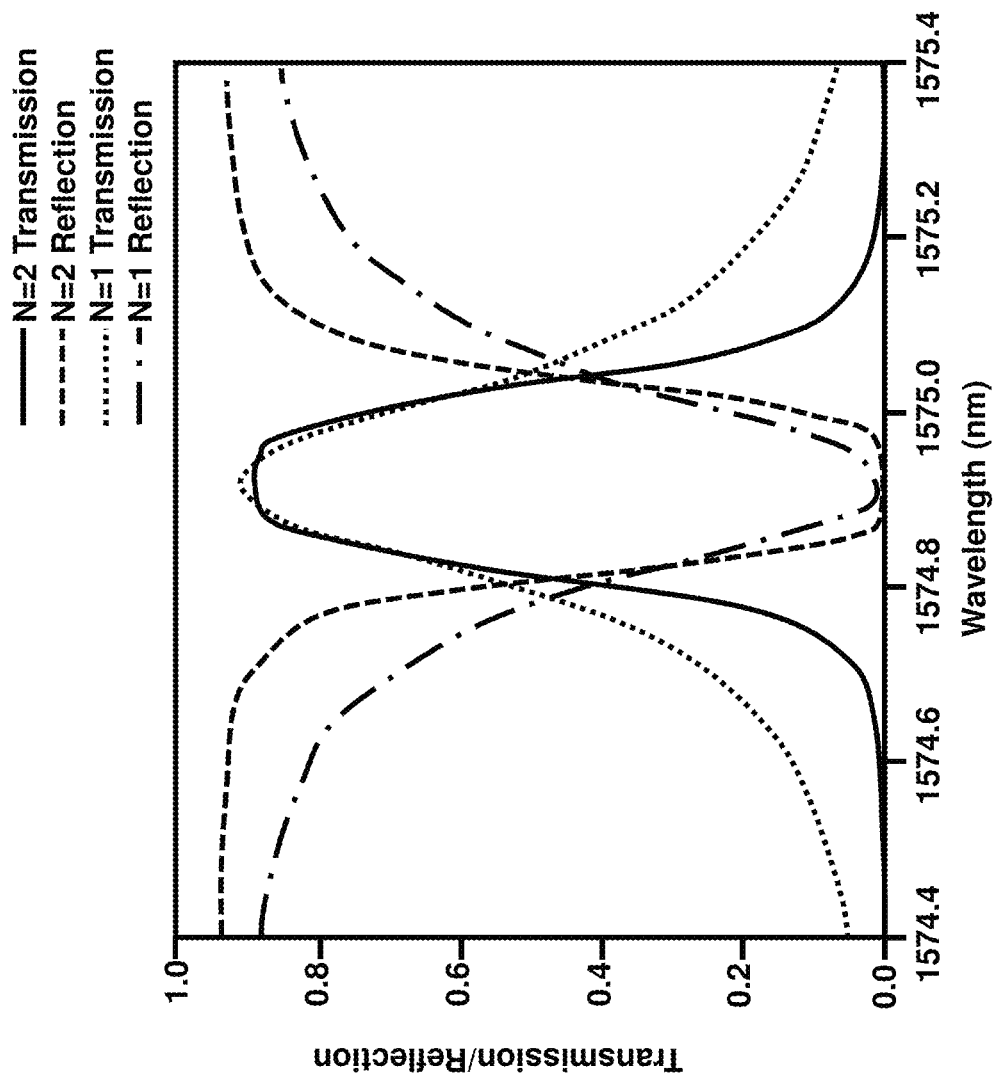
FIG. 4 is a graph illustrating transmission and reflection profiles for individual and N=2 CROW PhC nanobeam devices, according to an embodiment herein.
Figure 5A:
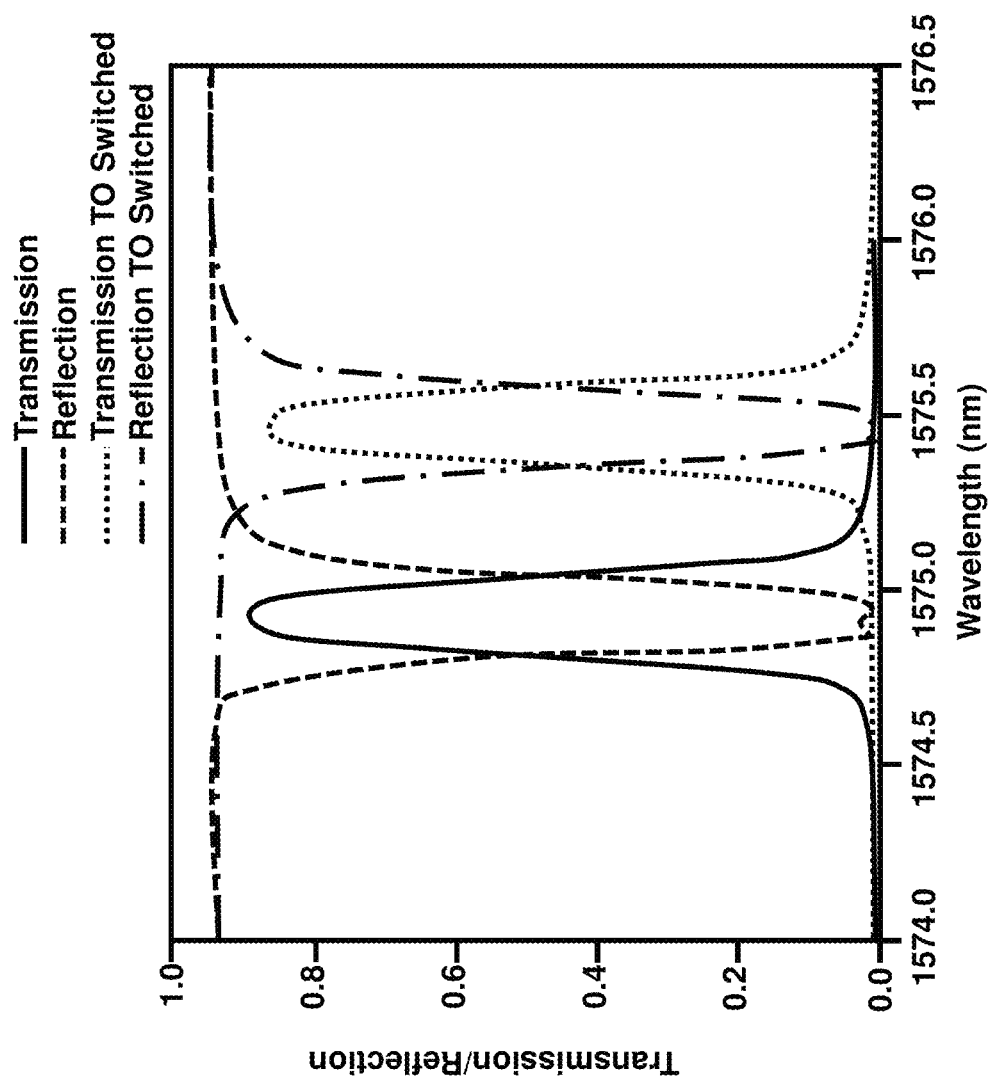
FIGS. 5A through 5C are graphs illustrating transmission and reflection profiles for CROW N=2 devices in cross and bare states, according to an embodiment herein.
Figure 5B:
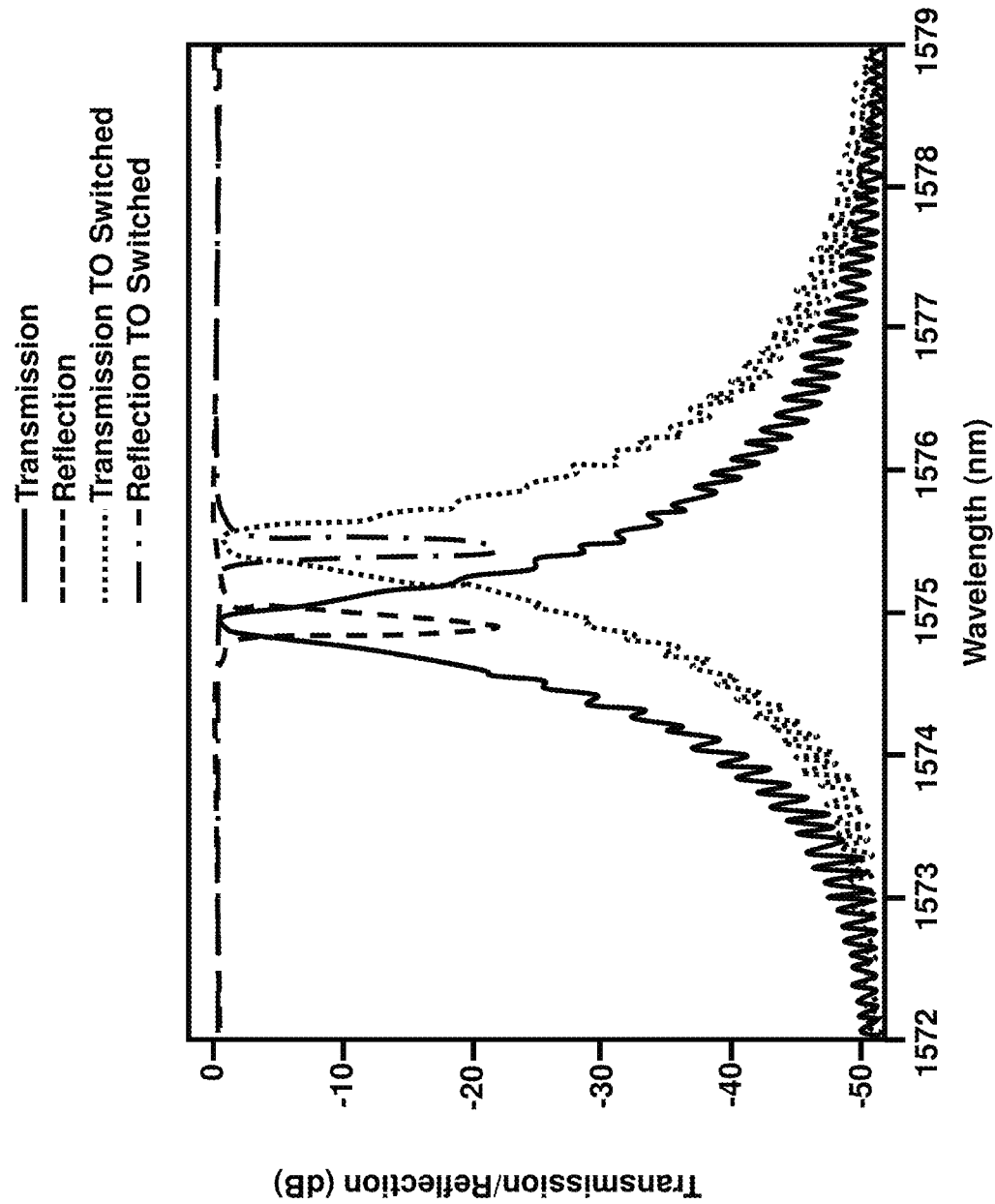
Figure 5C:
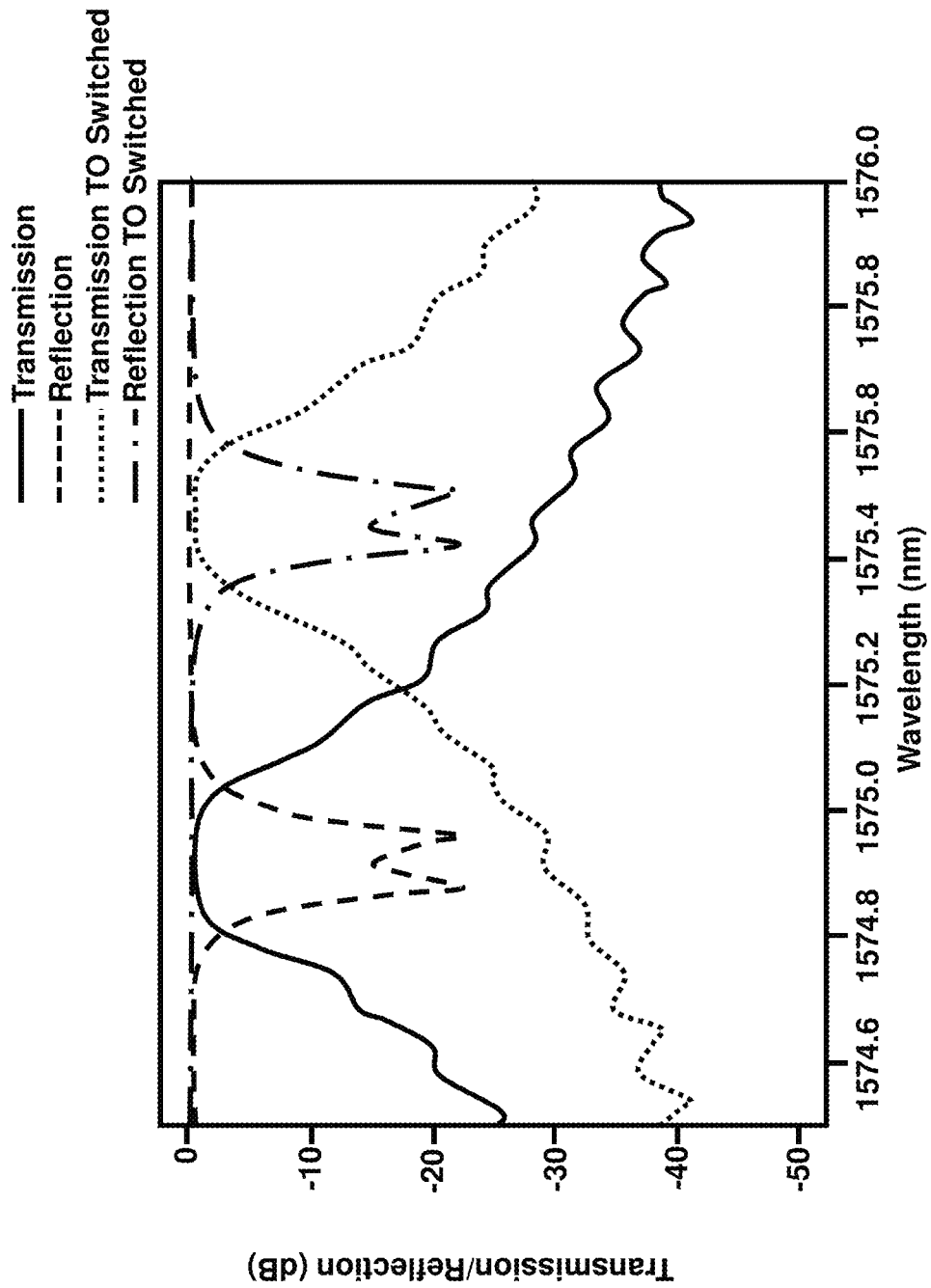
Figure 6A:
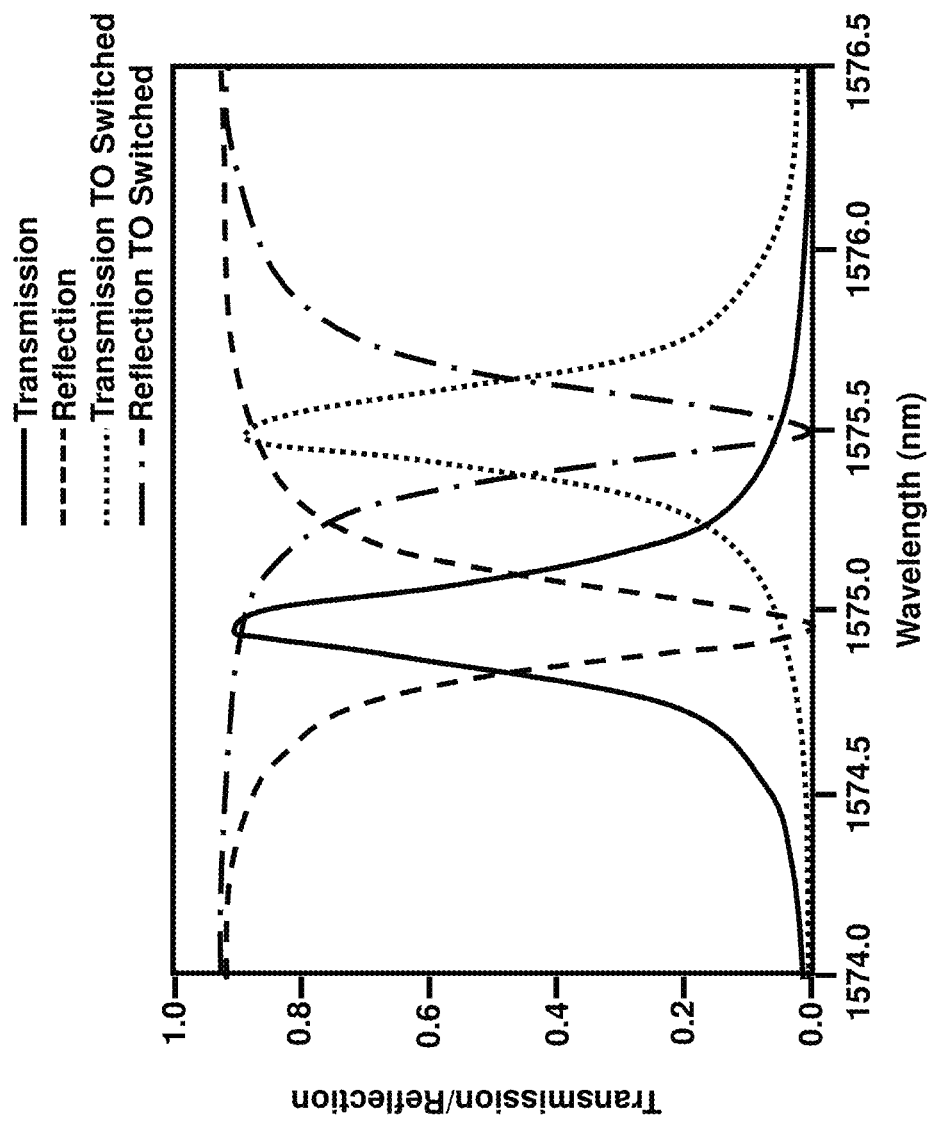
FIGS. 6A through 6C are graphs illustrating transmission and reflection profiles for individual N=1 devices in cross and bare states, according to an embodiment herein.
Figure 6B:
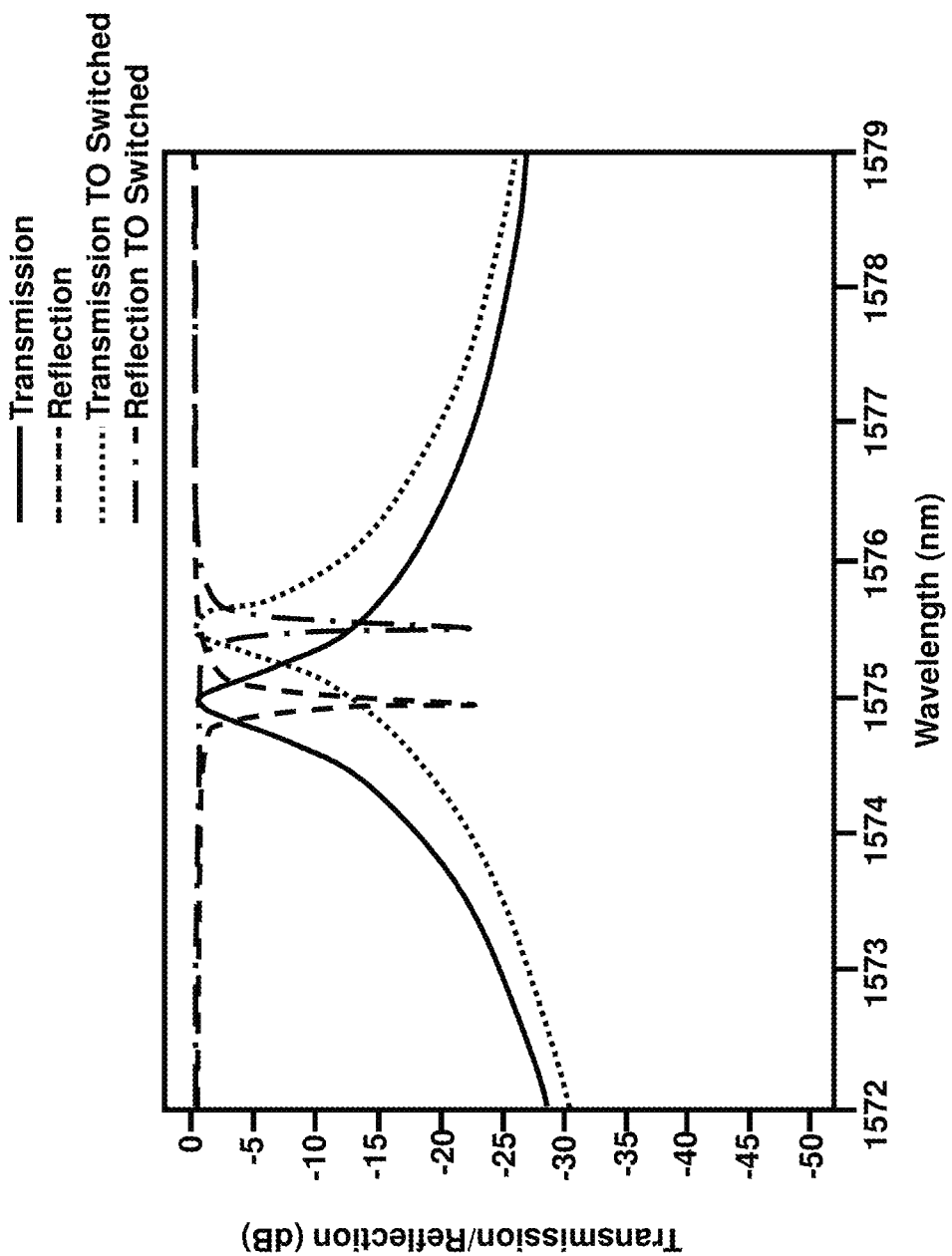
Figure 6C:
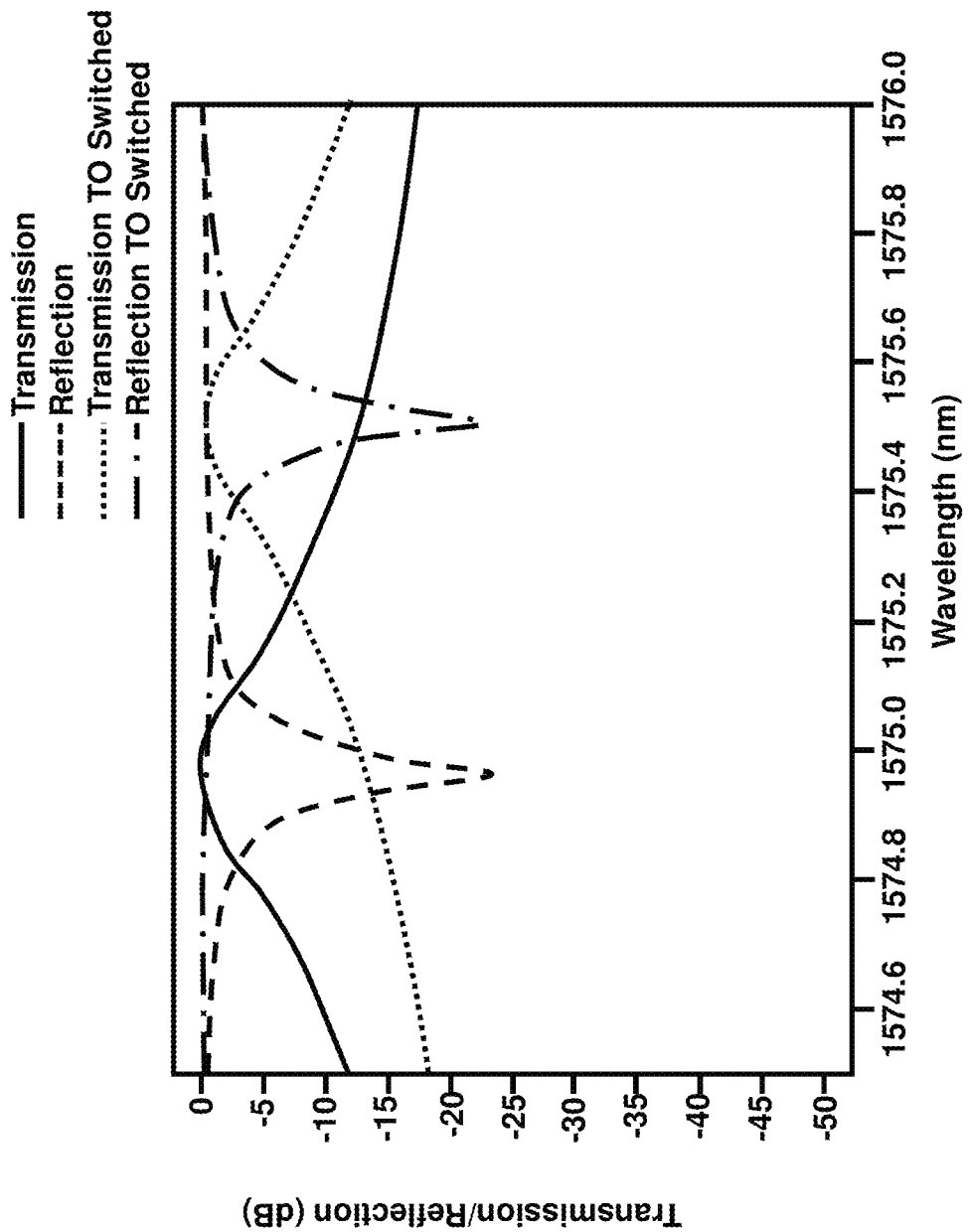

Simulations are performed using a Lumerical Finite-Difference Time-Domain (FDTD) device (available from Lumerical Inc., Vancouver, CANADA). The silicon layer 40 is assumed to have a refractive index of 3.475 while the locally doped N and P regions 80 are assumed to have complex indices of 3.474148+0.000112i and 3.47396+0.000031i, respectively. This equates to doping concentrations of $1 \times 10^{18}$ $cm^{-3}$ for N-doping and $5 \times 10^{17}$ $cm^{-3}$ for P-doping. Upon TO switching, the locally heated region of silicon layer 40 undergoes a Δn=0.002 increase in its refractive index. The thermally activated area is assumed to be 2 μm in length while extending the full width and height of the waveguide. Using the Lumerical device, the necessary voltage across the P-I-N structure was found to be ~1.75 V for an 11 K temperature change. The temperature gradient is well confined between the locally doped regions 80 of the device. The mesh size around the PhC device was 5 nm, which was chosen after convergence testing larger and smaller mesh sizes. A TE mode is injected into one end of the waveguide and the transmitted and reflected powers are calculated. FIG. 4, with reference to FIGS. 1A through 3D, shows a comparison of the transmitted and reflected signals for an N=1 individual and for an N=2 CROW PhC nanobeam device, in the unswitched state. The sidewall profile of the resonance is obviously much steeper for the CROW, making it a good candidate for improving the CT in MZI switches.

FIGS. 5A through 5C and 6A through 6C, with reference to FIGS. 1A through 4, show the transmission and reflection profiles in the bare unheated state and in the TO switched states for the individual and the CROW designs, respectively. The data is displayed in both linear and logarithmic scales. The axes for all plots are maintained the same to make for easy visual comparison. The sidewall profile for the CROW device is much steeper than in the individual case and that the out-of-band performance of the CROW is superior.

In both N=1 and N=2, the wavelength of operation is the peak wavelength of the unheated state. Metrics for the individual and the CROW devices are shown in Table 1. Here, the spectral-band full width at 20%, 50%, and 80% maximum signal are recorded as well as the insertion loss (IL) and cross talk (CT). In the N=1 case, there is a 0.392 nm change in the bandwidth of the resonance when going from 20% to 80% maximum signal. For the N=2 CROW case there is only a 0.146 nm change over that same range, which is a 67% reduction. In the cross state the performance of both devices is more or less comparable, as well as in the IL of the bar state. For the CT in the cross state, the −18.5 dB value is an average taken over the wavelength range of the two local minima in the resonance profile. It is in the CT of the bar state where the CROW device shows a drastically increased performance with a −15.7 dB improvement.

TABLE 1

Full width (nm), IL (dB), and CT (dB) metrics for individual N = 1 and CROW N = 2 devices

|   | FW 80% | FW 50% | FW 20% | IL-cross | CT-cross | IL-bar | CT-bar |
|---|---|---|---|---|---|---|---|
| N = 1 | 0.156 | 0.274 | 0.548 | −0.4 | −23.5 | −0.5 | −13.0 |
| N = 2 | 0.163 | 0.233 | 0.309 | −0.5 | −18.5 | −0.3 | −28.7 |

Figure 7:
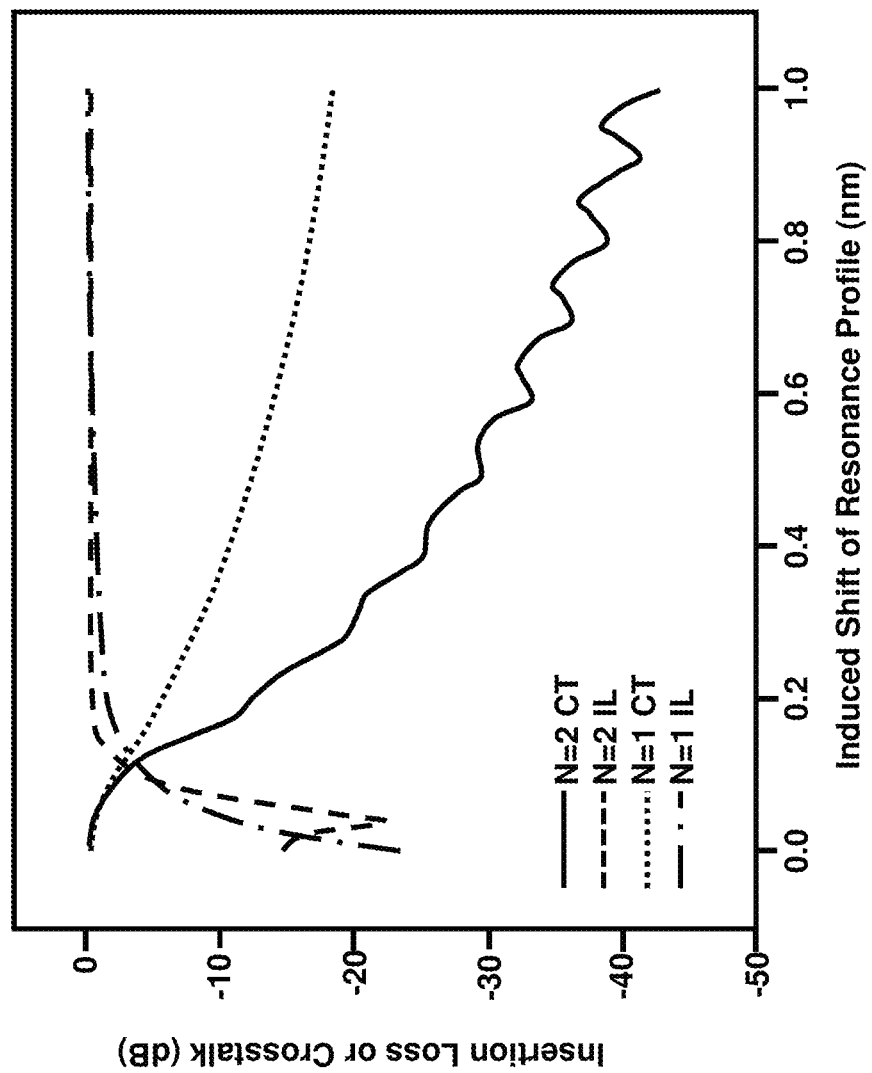
FIG. 7 is a graph illustrating IL and CT as a function of induced resonance wavelength shift for a CROW N=2 device, according to an embodiment herein.

In FIG. 7, with reference to FIGS. 1A through 6C, the IL and CT are shown as a function of induced wavelength-shift in the resonance profile. The IL metrics are fairly comparable over the examined resonance shift values. Meanwhile, the CT values are only comparable over an induced shift range of 0.1 nm beyond which the performance of the CROW device shows dramatic improvement. At an induced shift value of 1.0 nm the CROW device has an additional reduction of CT of 25 dB.

The design of a photonic crystal nanobeam based 2×2 Mach-Zehnder interferometer crossbar switch 10 comprising of coupled resonator optical waveguides 30 has been experimentally verified. The transmission profile for an individual N=2 CROW nanobeam shows a large improvement in the sidewall steepness of the resonance. A 3.5× increase in the full width bandpass when going from 80% maximum signal to 20% was seen in the individual case while only a 1.9× increase was seen for the CROW case. The 2×2 switching metrics, under thermo-optic shifting, showed that insertion loss is comparable between both devices. The true benefit of the CROW device is seen in the crosstalk value in the bar state were dramatic improvement is seen. The improved performance of the N=2 does, however, require twice the heating power of the N=1.

The embodiments herein reduce the crosstalk in on-chip 2×2 Mach-Zehnder-based optical switches 10 to solve the problem of unwanted noise in telecommunication-based systems. The embodiments herein spectrally shape the transmission and reflection of a light field 65, making it more rectangular is shape which allows for reduced noise as well as reduced energy consumption for optical switching.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. An optical switch comprising:
   a first Mach-Zehnder waveguide interferometer;
   a second Mach-Zehnder waveguide interferometer substantially parallel to the first Mach-Zehnder waveguide interferometer; and
   a pair of directional couplers, wherein each directional coupler is connected at each end of the first Mach-Zehnder waveguide interferometer and the second Mach-Zehnder waveguide interferometer,
   wherein each of the first Mach-Zehnder waveguide interferometer and the second Mach-Zehnder waveguide interferometer comprise a pair of coupled resonator optical waveguides sequentially aligned to one another and each comprising:
   a semiconductor substrate;
   a silicon layer above the semiconductor substrate;
   an elongated photonic crystal structure on the silicon layer to propagate an electromagnetic signal therethrough;
   a plurality of holes in the elongated photonic crystal structure; and
   a pair of electrical contacts in the silicon layer and positioned adjacent to the elongated photonic crystal structure.

2. The optical switch of claim 1, wherein the pair of coupled resonator optical waveguides are spaced apart from one another.

3. The optical switch of claim 1, wherein the plurality of holes are substantially perpendicular to a direction of a longitudinal axis of the elongated photonic crystal structure.

4. The optical switch of claim 1, wherein the pair of coupled resonator optical waveguides are configured to spectrally shape a transmission and reflection of a light field created by the electromagnetic signal by shaping the light field to be substantially rectangular.

5. The optical switch of claim 4, wherein the spectral shaping of the transmission and reflection of the light field is configured to reduce a noise of the electromagnetic signal.

6. The optical switch of claim 4, wherein the spectral shaping of the transmission and reflection of the light field is configured to reduce an energy consumption required for optical switching of the electromagnetic signal.

7. The optical switch of claim 1, wherein the pair of electrical contacts vertically sandwich the elongated photonic crystal structure.

8. The optical switch of claim 1, wherein the pair of electrical contacts laterally sandwich the elongated photonic crystal structure.

9. The optical switch of claim 1, wherein the silicon layer is disposed on each longitudinal side of the elongated photonic crystal structure.

10. The optical switch of claim 9, wherein the silicon layer on each longitudinal side extends a length of the elongated photonic crystal structure.

11. An in-line coupled dual nanobeam Mach Zehnder interferometer comprising:

a semiconductor substrate;

a silicon layer above the semiconductor substrate;

a pair of photonic crystal structures spaced apart from each other and sequentially aligned on the silicon layer to transmit an optical signal therethrough;

a plurality of 1D tapered-diameter lattice air holes aligned along a longitudinal axis of the pair of photonic crystal structures;

doped regions in the silicon layer and positioned adjacent to the pair of photonic crystal structures;

an input coupler connected to a first end of a first photonic crystal structure of the pair of photonic crystal structures to input the optical signal into the pair of photonic crystal structures; and an output coupler connected to a second end of a second photonic crystal structure of the pair of photonic crystal structures to output the optical signal from the photonic crystal structure, wherein the pair of photonic crystal structures are configured to spectrally shape a transmission and reflection of a light field created by the optical signal by shaping the light field to be substantially rectangular.

12. The Mach Zehnder interferometer of claim 11, wherein the doped regions comprise P-N doped regions.

13. The Mach Zehnder interferometer of claim 11, wherein the doped regions comprise P-I-N doped regions.

14. The Mach Zehnder interferometer of claim 11, wherein the doped regions comprise P-I-P doped regions.

15. The Mach Zehnder interferometer of claim 11, wherein the doped regions comprise N-I-N doped regions.

16. The Mach Zehnder interferometer of claim 11, wherein the pair of photonic crystal structures are spaced apart from each other by a separation distance that is equal to a photonic crystal lattice spacing.

17. The Mach Zehnder interferometer of claim 16, wherein the photonic crystal lattice spacing is 350 nm.

18. An optical switch comprising:

a pair of photonic crystal structures aligned to transmit an electromagnetic signal;

a plurality of holes positioned through the pair of photonic crystal structures and oriented substantially transverse to a longitudinal axis of the pair of photonic crystal structures;

a plurality of electrical contacts connected to the pair of photonic crystal structures; and a pair of couplers connected to the pair of photonic crystal structures, wherein the pair of photonic crystal structures are configured to spectrally shape a transmission and reflection of a light field created by the electromagnetic signal by shaping the light field to be substantially rectangular, wherein the spectral shaping of the transmission and reflection of the light field is configured to reduce a noise of the electromagnetic signal, and wherein the spectral shaping of the transmission and reflection of the light field is configured to reduce an energy consumption required for optical switching of the electromagnetic signal.

19. The optical switch of claim 18, wherein the plurality of holes comprises 1D tapered-diameter lattice holes.

20. The optical switch of claim 18, wherein the plurality of electrical contacts are configured for any of thermo optic and electro optic switching.

* * * * *